(12) United States Patent
Abernethy, Jr. et al.

(10) Patent No.: US 7,689,355 B2
(45) Date of Patent: Mar. 30, 2010

(54) METHOD AND PROCESS FOR ENABLING ADVERTISING VIA LANDMARK BASED DIRECTIONS

(75) Inventors: Michael N. Abernethy, Jr., Pflugerville, TX (US); Kulvir S. Bhogal, Fort Worth, TX (US); Travis M. Grigsby, Austin, TX (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 11/417,963

(22) Filed: May 4, 2006

(65) Prior Publication Data

US 2007/0260393 A1    Nov. 8, 2007

(51) Int. Cl.
*G06F 19/00* (2006.01)
(52) U.S. Cl. .................. 701/213; 701/208; 705/27; 340/995
(58) Field of Classification Search .......... 701/207, 701/208, 213; 705/27, 14, 10; 715/757, 715/716; 340/990, 995
See application file for complete search history.

(56) References Cited

U.S. PATENT DOCUMENTS

| 5,470,233 | A | | 11/1995 | Fruchterman et al. |
|---|---|---|---|---|
| 6,055,478 | A | | 4/2000 | Heron |
| 2003/0078035 | A1 | * | 4/2003 | Sheha et al. ............... 455/414 |
| 2005/0203698 | A1 | * | 9/2005 | Lee ........................... 701/200 |
| 2005/0209776 | A1 | | 9/2005 | Ogino |
| 2007/0168524 | A1 | * | 7/2007 | Chao et al. .................. 709/228 |
| 2008/0070588 | A1 | * | 3/2008 | Morin ..................... 455/456.1 |
| 2008/0070593 | A1 | * | 3/2008 | Altman et al. .............. 455/457 |
| 2009/0191901 | A1 | * | 7/2009 | Behr et al. .................. 455/457 |
| 2009/0241040 | A1 | * | 9/2009 | Mattila et al. ............... 715/760 |
| 2009/0254824 | A1 | * | 10/2009 | Singh ......................... 715/716 |
| 2009/0259568 | A1 | * | 10/2009 | Lee ............................. 705/27 |

* cited by examiner

*Primary Examiner*—Khoi H. TRan
*Assistant Examiner*—Ronnie Mancho
(74) *Attorney, Agent, or Firm*—Dillon & Yudell LLP

(57) ABSTRACT

A method, system, and computer program product that enables a direction service to automatically inform the requester or user of the directions of advertisement associated with the various businesses and/or landmarks situated on a directional map generated by the service. The service provider of the navigational service enhances the directional offerings to include advertisements associated with specific businesses and/or points of interest within the service's mapping database. When a generated route/direction includes landmarks (e.g., one or more of the businesses or other point of interest), which have an associated advertisement, the service displays (or outputs via audible or other means) the advertisement to the user, along with the directions. In this way the user is provided an output that includes the directions, landmarks (businesses and/or points of interest) along the routes, as well as an output of the specific advertisement associated with each of these landmarks.

1 Claim, 3 Drawing Sheets

METHOD AND PROCESS FOR ENABLING ADVERTISING VIA LANDMARK BASED DIRECTIONS

BACKGROUND OF THE INVENTION

1. Technical Field

The present invention relates generally to direction mapping processes and in particular to a method for providing landmarks within direction mapping processes. Still more particularly, the present invention relates to a method, system, and the computer program product for providing advertisement associated with landmarks within direction mapping processes.

2. Description of the Related Art

Many people today rely on the Internet and/or GPS-enabled location finders to get directions to an address/destination. Landmark-based route representations, describing a path from one location to another, have become a powerful tool for communicating and visualizing directions. Navigational services provide sequences of instructions, guiding the user along the fastest route from one location to a destination point. Because many people are better with landmarks than street names in deciphering directions (e.g., "turn left at the McDonalds"), several navigational services now provide a description of landmarks to aid the user/driver in determining when he/she has reached a certain point within the given directions/route.

Http site //publications.csail.mit.edu/abstracts/abstracts05/whiting/whiting.html provides an online publication describing navigational uses of landmarks consist of identifying origin and destination points, identifying decision points (points of reorientation, or junctions where current orientation is maintained), verifying route progress, influencing expectation, providing orientation cues, and identifying regional differentiating features. Discussions on the importance of landmarks in directions are provided at http site //www-csli.stanford.edu/events/Coglunch/Abstracts/tom-052004.txt.

SUMMARY OF THE INVENTION

Disclosed is a method, system, and computer program product that enables a direction service to automatically inform the requester or user of the directions of advertisement associated with the various businesses and/or landmarks situated on a directional map generated by the service. The service provider of the navigational service enhances the directional offerings to include advertisements associated with specific businesses and/or points of interest within the service's mapping database. When a generated route/direction includes landmarks (e.g., one or more of the businesses or other point of interest), which have an associated advertisement, the service displays (or outputs via audible or other means) the advertisement to the user, along with the directions. In this way the user is provided an output that includes the directions, landmarks (businesses and/or points of interest) along the routes, as well as an output of the specific advertisement associated with each of these landmarks.

In one embodiment, the advertisement is only displayed (outputted to the user) when the user approaches the area proximate to the specific landmark. In this manner, the user is provided in-time reminders of specials and/or other advertisement associated with landmarks within the immediate vicinity around the user. With millions of people now utilizing these navigational services, opportunities are available for the service providers to charge businesses to display the advertisement, while also providing their users with other valuable information associated with the directions and/or the landmarks and other points of interest along the route. Smaller chain businesses, such as local family restaurants may utilize this feature to advertise to visitors to the area by displaying a menu and/or a discount for visitors who stop to eat, for example.

When a computer or similar device is being utilized to pull up the directions, the display of the landmark may also be highlighted with a selectable link that enables the user to selectably access/open a separate screen or pop-up window within which the advertisement for that landmark is displayed. In one embodiment, the selectable link may be to the web site of the business, enabling the user to browse to the website to search for items.

In one embodiment, the landmarks are utilized via an interactive location finding feature in which the device queries the user to acknowledge a landmark and responds to the acknowledgement or lack thereof from the user to further define landmarks within the given directions.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and computer program product that enables a direction service to automatically inform the requester or user of the directions of advertisement associated with the various businesses and/or landmarks situated on a directional map generated by the service. The service provider of the navigational service enhances the directional offerings to include advertisements associated with specific businesses and/or points of interest within the service's mapping database. When a generated route/direction includes landmarks (e.g., one or more of the businesses or other point of interest), which have an associated advertisement, the service displays (or outputs via audible or other means) the advertisement to the user, along with the directions. In this way the user is provided an output that includes the directions, landmarks (businesses and/or points of interest) along the routes, as well as an output of the specific advertisement associated with each of these landmarks.

Figure 1:
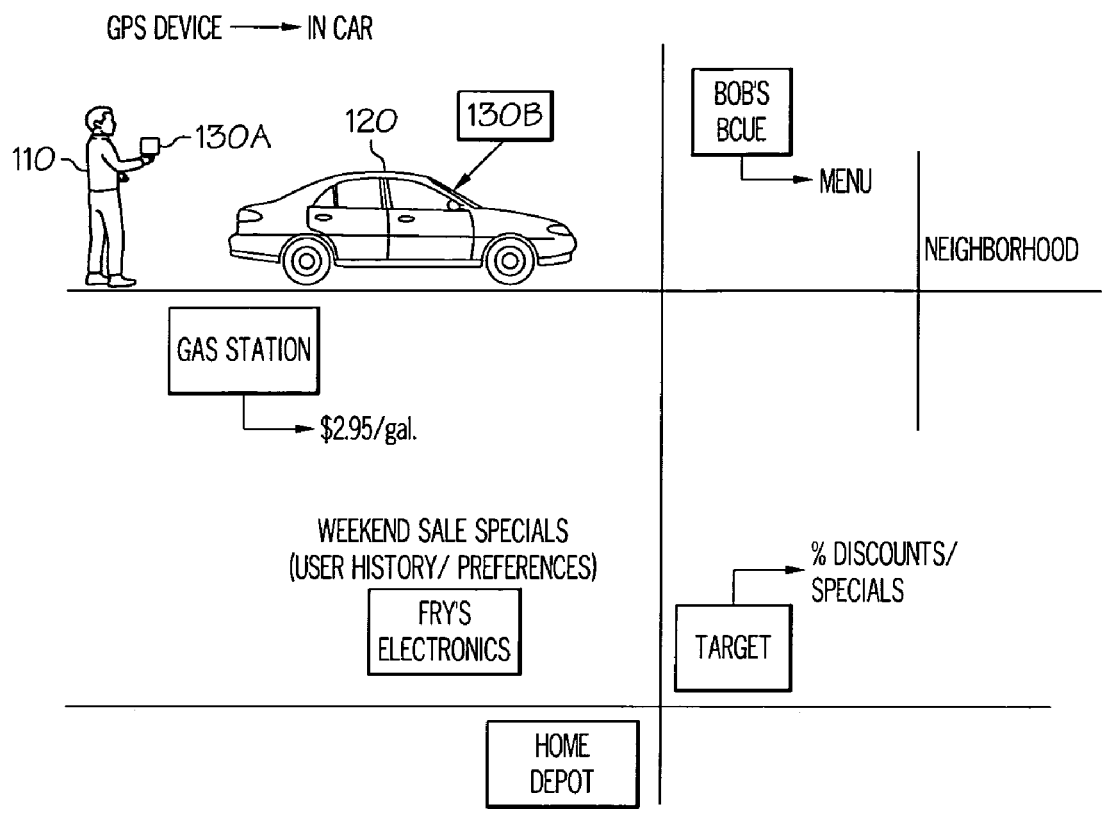
FIG. 1 is a non-to-scale representation of a navigational map of an area within which a user is traveling with landmarks providing advertising according to one embodiment of the invention.

With reference now to the figures, FIG. 1 depicts a rough representation of a directional map of an area that includes several businesses and/or places of interests (collectively referred to hereinafter as landmarks), according to one embodiment of the invention. The directional map 100 may be generated on a portable user device, a client system browser, or a GPS device within a vehicle. As shown, directional map comprises streets and intersections, and a plurality of landmarks, of which a gas station, Bob's barbecue, Fry's Electronics®, Home Depot® and Target® are illustrated. Located on a first street, is a person 110 with a portable GPS device 130A. Also illustrated on the street is a car 120 having therein a GPS device 130B. For description of the invention, it is assumed that both (or either) person 110 and car 120 are traveling through the area depicted by the directional map and have displayed on their respective GPS devices 130A, 130B some representation of the directional map, which includes the various landmarks.

Notably, each landmark is illustrated as a business having some business-related information, which is being advertised by that business. Thus, for example, Bob's barbecue is advertising its menu of succulent barbecue delights, while Target® is advertising its specials/discounts/sales for the day, and the gas station is advertising its gas prices. As will be further described below, each of these advertisements are linked to their respective businesses and are displayed (or otherwise outputted) to the person 110 or the driver/passengers of the car 120 on their respective GPS devices 130A, 130B.

Figure 2:
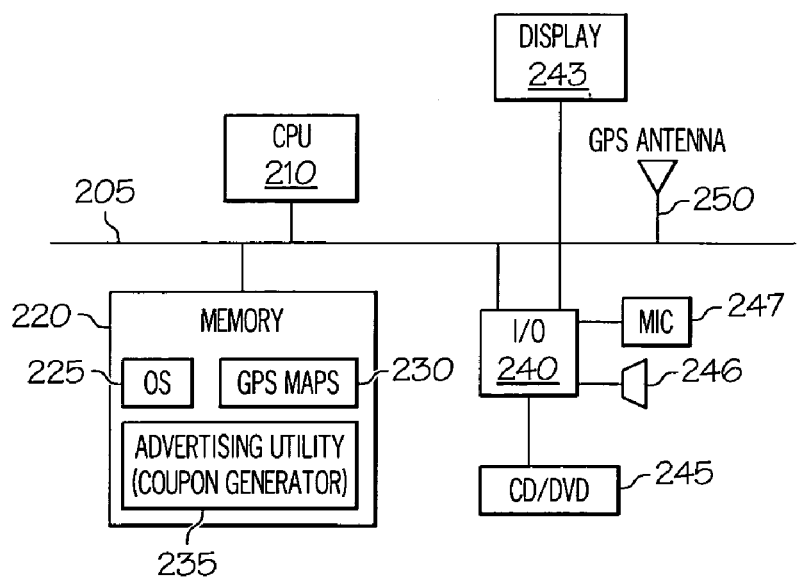
FIG. 2 is a block diagram representation of a data processing system that may be utilized as either a web/GPS server or web browser/GPS/user device enhanced with a landmark advertising and direction (LAD) utility according to one embodiment of the invention.

Referring now to FIG. 2, there is depicted a block diagram representation of a data processing (or computer) system that may be implemented as one of GPS devices 130A/B in FIG. 1 or as client browser linked to a service provider's server, or as a service provider's server, in accordance with the various embodiments of the present invention.

When representative of a client browser, the computer system 200 is any device on which web browser software is executed to access specific web pages on which requests for the navigational information is entered, while when representative of a server, the computer system 200 represents an internet or wireless or GPS accessible server on which a service provider provides a user with the navigational information requested. The specific configuration and/or implementation of computer system 200 is not determinative of the invention and any type of device may be utilized that enables the user to access the landmark information with advertising and other features described herein. FIG. 2 is therefore intended as an example, and does not imply any structural, logical or architectural limitations on the present invention. For simplicity of the description, however, the invention is described from the perspective of the user and a GPS device that enables in-time updates of location and proximate advertising of landmarks in the vicinity of the user.

As illustrated, computer system 200 comprises processor 210 coupled to memory 220, and input/output (I/0) controller 240 via system bus 205. I/0 controller 215 provides the connectivity to and/or control over input devices, such as a pointer, keyboard, speaker 246 and CD/DVD drive 245, and output devices, such as microphone 247 and display device 243. Computer system (more appropriately called a GPS receiver) also comprises GPS antenna 250.

In on embodiment, in which computer system 200 is a server and/or a client device, computer system 200 also comprises a network interface device (NID) utilized to connect computer system 200 to another computer system and/or computer network. NID 230 may be an Ethernet card or modem or wireless transceiver, for example, depending on the type of network (e.g., local area network (LAN) or wide are network (WAN), Internet, or wireless) to which the computer system 200 is connected.

As alluded to above, the hardware components of computer system 200 are of conventional design. Computer system 200 may also include other components (not shown). It will therefore be appreciated that the system described herein is illustrative and that variations and modifications are possible. Thus, while the invention is describe as being implemented in a computer system 200, those skilled in the art appreciate that various different configurations of computer systems exists and that the features of the invention are applicable regardless of the actual configuration of the computer system.

Located within memory 220 and/or on a CD/DVD inserted within CD/DVD drive 245 and executed on processor 210 are a number of software components, including operating system (OS) 225 (e.g., Microsoft Windows®, a trademark of Microsoft Corp, or GNU®/Linux®, registered trademarks of the Free Software Foundation and The Linux Mark Institute) and a plurality of software applications, including perhaps a web browser (for client systems). Key among the software applications is GPS mapping utility 230 and landmark advertising and directional (LAD) utility 235, which, as is further described below, is the engine that enables most of the functional features of the invention. In one implementation, the LAD utility 235 is a separate utility from the GPS utility and is added on top of existing GPS code. In another embodiment, GPS code is enhanced with the functionality of the LAD utility 235 of the shelf.

Figure 3:
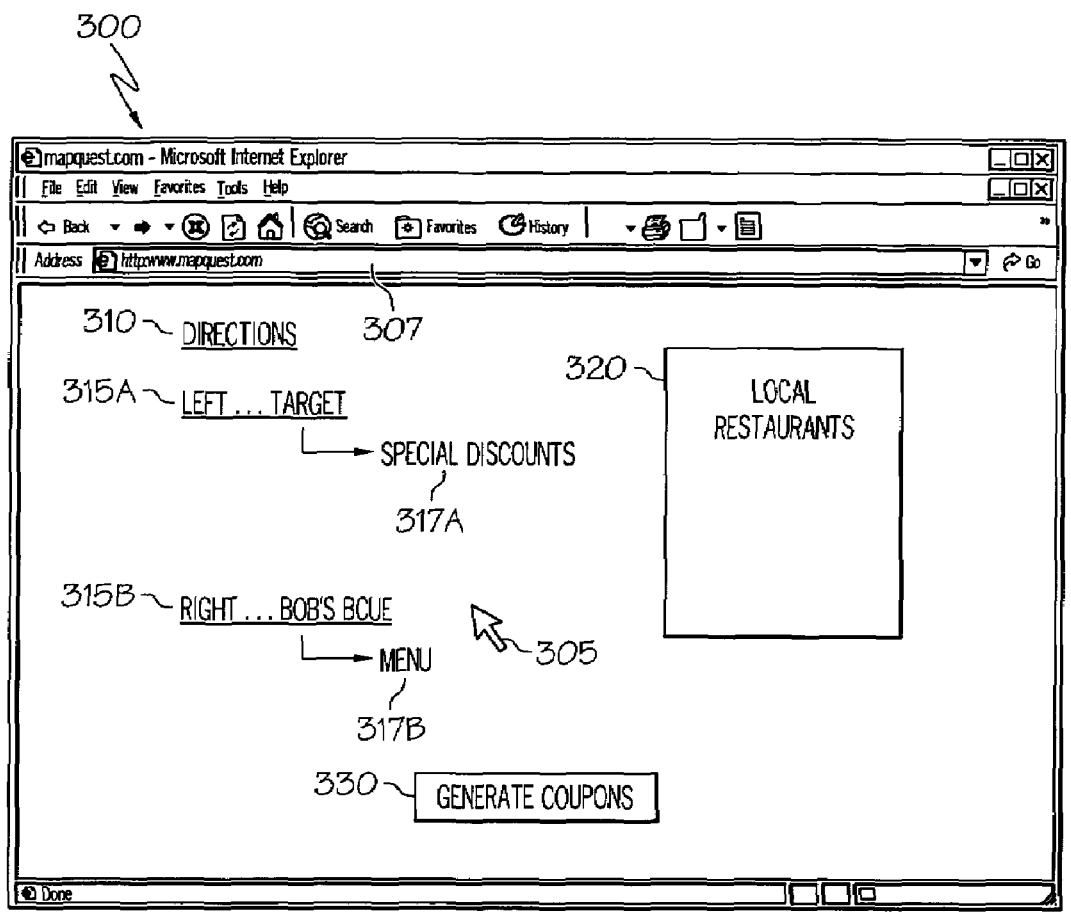
FIG. 3 is an example web browser of an online navigational service with selectable links associated with specific landmarks within the generated directions, according to one embodiment of the invention.
Figure 4:
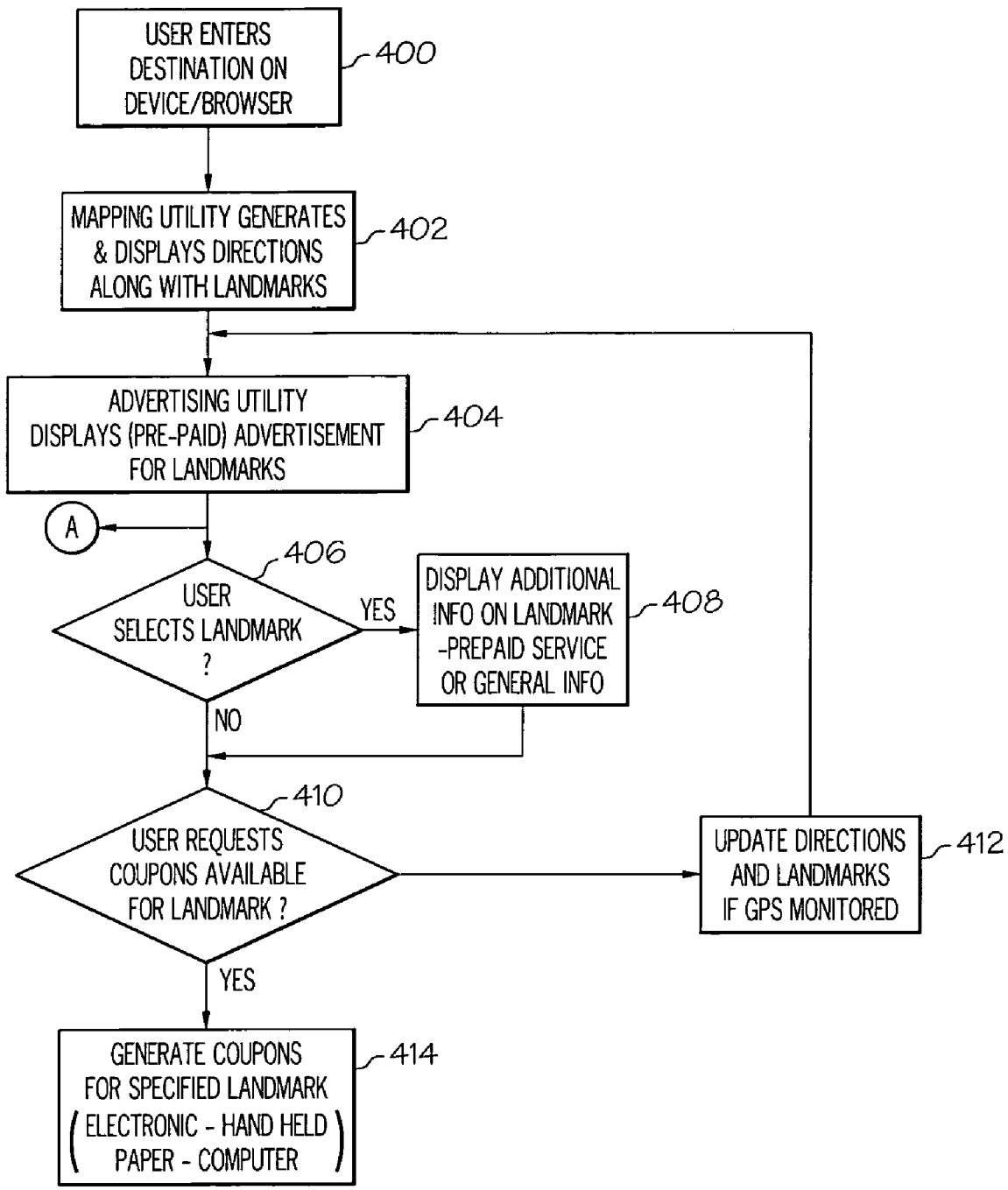
FIG. 4 is a flow chart of the process of enabling advertising within a navigational service when retrieving and utilizing directional information that includes landmarks in accordance with one embodiment of the invention.

When executed by processor the combination of GPS and LAD utilities enables the device to monitor for landmarks, display these landmarks within a generated navigational map, and display or otherwise output any advertising associated with the respective landmarks as the user approaches the area proximate to the landmark(s), and other related features and functionality described herein with reference to FIGS. 3 and 4.

Turning first to FIG. 4, there is illustrated a flow chart of one example process by which the landmark based advertising features are implemented. The process begins at block 400 when the user enters a specific destination the user wishes to travel to on his device/browser. The mapping utility then generates and displays a navigational map (directions), which also includes landmarks, as shown at block 402. The location advertising and display (LAD) utility then displays any advertising associated with those landmarks, as shown at block 404. These advertising may be pre-paid ads or ones that are paid for based on user access. Then, at block 406 a determination is made whether the user selects the particular landmark (and/or the advertising link associated therewith). If yes, then the LAD utility displays the additional advertisement information linked to the landmark, as indicated at block 408. Then, a check is made whether the user enters a request for coupons for the landmark. If the user does request coupons then the coupons are generated for the specific landmark either electronically or in paper form, as shown at block 414. Otherwise, the directions are updated as the user moves towards the destination, as shown at block 412, and new/different landmarks are presented to the user.

In one embodiment, the advertisement is only displayed (outputted to the user) when the user approaches the area proximate to the specific landmark. In this manner, the user is provided in-time reminders of specials and/or other advertisement associated with landmarks within the immediate vicinity around the user. With millions of people now utilizing these navigational services, opportunities are available for the service providers to charge businesses to display the advertisement, while also providing their users with other valuable information associated with the directions and/or the landmarks and other points of interest along the route. Smaller chain businesses, such as local family restaurants may utilize this feature to advertise to visitors to the area by displaying a menu and/or a discount for visitors who stop to eat, for example.

The level of user access to the advertisement associated with a landmark may be tracked by the service, and utilized to charge the business for a "use" fee. In this manner, the business may be charged on a per access basis for the advertisement rather than simply for the opportunity to display the advertisement. The utility gathers data about the degree to which certain advertisements are accessed/investigated and may further utilize this information for other statistical analysis, such as which types of businesses to target for advertising with their service, etc.

With reference now to FIG. 3, wherein is illustrated an example client browser view of retrieved directions from an online (Internet) based service such as Mapquest®. As illustrated, when a computer or similar device is being utilized to retrieve the directions, the display provided comprises the directions 310, which include the corresponding landmarks, e.g., Target 315A and Bob's barbecue 315B. Each landmark is displayed with an associated advertising link (317) that enables the user to selectably access/open a separate screen or pop-up window within which the advertisement for that landmark is displayed.

In the illustrative embodiment, the advertisement associated with Bob's barbecue 315B is Bob's menu 317B, while that associated with Target 315A is the specials/discounts 317A being offered by that store. In another embodiment, the selectable link may be to the web site of the business, enabling the user to browse to the website to search for items.

Notably, one extension of this idea involves generating coupons for specific landmarks that the user will pass while traveling along the directions. A generate coupon button 330 would then provide the user with coupons for the displayed landmark to entice the user to stop at the landmark to conduct business (e.g., have lunch at Bob for 10% off). Another landmark feature may involve simply providing the list of restaurants in the general area with their advertisements within a local restaurant box 320. Thus, for example, the service would inform the user that the particular landmark, "Bob's barbecue, located 2 blocks down the road on the right is providing a $5.00 all you can eat lunch special until 1:30 PM."

With the present invention, even businesses that are not considered landmarks in the traditional sense (i.e., those that are not at a major intersection or on the main route) are now added to the maps generated for a particular area so that those businesses are also able to advertise to the users who generate a navigational map. Landmarks may also be provided that indicate to the user when the user has gone too far and the GPS utility would then provide new directions to the user from the landmark used to the desired destination, all while providing the "too far" landmark an opportunity to advertise to the user. The business would be required to pay for the right to advertise within the mapping service, and perhaps be charged a fee for each person or group of users who actually are presented the advertising while they are in the vicinity of the business.

In one implementation, the invention extends general landmark-based directional functionality by providing interactive voice prompts with increasing detail and different landmarks. For example, while reading the directions, a voice prompt would say "There is a Target at this intersection—do you see it?" In response to a "no" from the user, the utility would then refine the information with "it is to the left—do you see it?" If a further "no" is received, then the utility would attempt additional landmarks such as "there is also a Shell station at the intersection—do you see that?" In response to the user saying yes, the utility would then say "turn left at the shell station." In this manner, landmark directions are updated by the utility since it is possible that a landmark in incorrectly mapped and or has been moved since the last update of the mapping utility.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method comprising:

receiving a request for a navigation route to a destination;

generating in response to the request, the navigational route to the destination including at least one point of interest;

when an input is received for assistance in finding the destination from a location within the navigational route:

determining a point of interest proximate to the location;

prompting the user to acknowledge whether the point of interest is observed;

when the user acknowledges observation of the point of interest, prompting the user to knowledge a next point of interest along the navigational route, whereby the user may be directed from one point of interest along the route to the next point of interest until the user arrives at the destination;

wherein said input is a voice request and said response is a voice response, and the method comprises receiving the voice requests as an input and generating the voice response as an output;

when the user does not acknowledge observation of the point of interest:

refining the points of interest to be more specific:

re-prompting the user to acknowledge observation of the refined, more specific point of interest; and providing further refinements to the more specific point of interest until the user acknowledges observation of at least one of the characteristics within the refined, more specific point of interest;

associating an advertisement with the point of interest;

enabling user access to the advertisement, wherein said enabling user access further comprises:

outputting a full content of the advertisement when the user access is initiated;

linking the advertisement to the specific point of interest; and informing the user of the location of the point of interest within the navigational route;

tracking each user access to the advertisement associated with the point of interest; and maintaining a database with information from the tracking, wherein said information may be utilize for later billing the owner of the point of interest based on a level of access to the advertisement.

* * * * *